United States Patent
Desjardine

(10) Patent No.: US 10,731,415 B2
(45) Date of Patent: Aug. 4, 2020

(54) LADDER SUPPLY BRACKET

(71) Applicant: Tyler Desjardine, Vernon (CA)

(72) Inventor: Tyler Desjardine, Vernon (CA)

(*) Notice: Subject to any disclaimer, the term of this patent is extended or adjusted under 35 U.S.C. 154(b) by 0 days.

(21) Appl. No.: 15/878,256

(22) Filed: Jan. 23, 2018

(65) Prior Publication Data

US 2019/0226278 A1    Jul. 25, 2019

(51) Int. Cl.
*E06C 7/14* (2006.01)
*F16M 13/02* (2006.01)
*E06C 1/04* (2006.01)

(52) U.S. Cl.
CPC ............ *E06C 7/14* (2013.01); *E06C 1/04* (2013.01); *F16M 13/022* (2013.01)

(58) Field of Classification Search
CPC .............................................. E06C 7/14
USPC ......................................... 248/210, 211, 238
See application file for complete search history.

(56) References Cited

U.S. PATENT DOCUMENTS

| | | | | |
|---|---|---|---|---|
| 655,100 A * | 7/1900 | Macy | ......... | E06C 7/16 248/238 |
| 978,550 A * | 12/1910 | Boyd | ......... | E06C 7/14 248/211 |
| 2,069,607 A * | 2/1937 | Gaw | ......... | E06C 7/16 182/103 |
| 2,243,799 A * | 5/1941 | Paul Glosier | ......... | B44D 3/14 248/211 |
| 2,351,310 A * | 6/1944 | Yarmolowich | ......... | E06C 7/16 248/238 |
| 2,453,355 A * | 11/1948 | Arnold | ......... | E06C 7/16 182/121 |
| 2,459,621 A * | 1/1949 | Cobb | ......... | E06C 7/12 182/102 |
| 2,536,967 A * | 1/1951 | Thurgate | ......... | E06C 7/146 248/211 |
| 2,618,515 A * | 11/1952 | Marchessault | ......... | E06C 7/16 248/210 |
| 2,628,071 A * | 2/1953 | Williams | ......... | B66D 3/04 182/129 |
| 3,291,521 A * | 12/1966 | Krueger | ......... | A47C 7/62 211/119.007 |
| 3,707,242 A * | 12/1972 | Golden | ......... | E06C 7/14 15/257.05 |
| 3,940,824 A * | 3/1976 | Gioia | ......... | B44D 3/126 15/257.06 |
| 4,036,463 A * | 7/1977 | Hopkins | ......... | B44D 3/123 248/110 |
| 4,972,923 A | 11/1990 | Krause | | |
| 4,979,710 A * | 12/1990 | Baldwin | ......... | E06C 7/14 248/210 |
| 4,991,808 A * | 2/1991 | LaChance | ......... | E06C 7/14 182/106 |

(Continued)

FOREIGN PATENT DOCUMENTS

| | | |
|---|---|---|
| GB | 2114098 | 7/1985 |
| GB | 2342949 | 4/2000 |
| GB | 2426789 | 9/2009 |

*Primary Examiner* — Bradley Duckworth
(74) *Attorney, Agent, or Firm* — Richard D. Okimaw

(57) ABSTRACT

An apparatus for holding supplies on a ladder having a plurality of laterally extending rungs supported by side rails comprising a U-shaped bracket having front and rear walls spaced apart to form a gap therebetween, at least one hook adapted to receive at least one ladder rung therein and wherein the bracket is secured to the at least one hook.

12 Claims, 8 Drawing Sheets

(56) References Cited

U.S. PATENT DOCUMENTS

| | | | |
|---|---|---|---|
| 5,064,090 A | 11/1991 | Farrier | |
| 5,079,795 A | 1/1992 | Schmid | |
| 5,133,525 A * | 7/1992 | Good | E06C 7/14 182/121 |
| 5,236,340 A | 8/1993 | Hall | |
| 5,275,256 A * | 1/1994 | Ellzey | E06C 7/14 104/246 |
| 5,431,249 A * | 7/1995 | Tredup | E06C 7/14 182/122 |
| 5,461,752 A * | 10/1995 | Lemon | B44D 3/12 15/257.05 |
| 5,542,553 A * | 8/1996 | Penniman | E06C 7/14 182/129 |
| 5,738,313 A * | 4/1998 | Rinke | F16L 3/22 248/211 |
| 5,836,043 A * | 11/1998 | Rovas | B44D 3/126 15/257.06 |
| 6,273,289 B1 * | 8/2001 | Bowman | B44D 3/14 220/482 |
| 6,431,509 B1 * | 8/2002 | Proulx | E06C 7/14 182/121 |
| 6,604,721 B2 | 8/2003 | Ahl | |
| 6,907,640 B2 * | 6/2005 | Rougeau | B44D 3/12 15/257.05 |
| 7,422,183 B2 * | 9/2008 | Monteleone | E06C 7/146 248/210 |
| 7,438,267 B2 * | 10/2008 | Bardill | F16B 45/00 248/210 |
| 8,016,075 B2 * | 9/2011 | Pohl | E06C 7/14 15/257.06 |
| 8,469,148 B2 | 6/2013 | Perry | |
| 2003/0213646 A1 * | 11/2003 | Gallion | E06C 7/14 182/129 |
| 2005/0056486 A1 * | 3/2005 | Butler | E06C 7/14 182/129 |
| 2009/0147527 A1 * | 6/2009 | O'Connor | E06C 7/14 362/396 |
| 2010/0213225 A1 | 8/2010 | Hadeed | |
| 2014/0110410 A1 * | 4/2014 | Androvett | E06C 7/14 220/475 |

* cited by examiner

LADDER SUPPLY BRACKET

BACKGROUND OF THE INVENTION

1. Field of Invention

The present invention relates generally to a ladder accessory and in particular to a bracket for holding building supplies, such as roofing tiles or shingles, capable of being removably mounted on a ladder.

2. Description of Related Art

When working from a ladder at an elevated level it is necessary to access tools and supplies. The supplies may be located at a supply location, while the worker is located on the ladder, requiring the worker to periodically move to the location of the supplies. Retrieving the supplies can be time consuming and potentially hazardous. To ensure that the supplies are conveniently located, a supply tray may be removably mounted to the ladder, such that the supplies are close to the worker. The location of the supply tray may be repositioned to any location along the ladder suitable to the worker.

In particular, a roofer requires access to roofing tiles or shingles when working from a ladder. In the prior art, trays that hang from hooks on the rungs of a ladder have been disclosed. Examples of these designs include U.S. Pat. No. 4,972,923 to Krause, and UK Patent No. 2,342,949 to Greenway. One disadvantage of a tray is that roofing shingles are not easily accessed therefrom as they must be stacked horizontally on top of one another and therefore difficult to grasp and remove from the package. Additionally, it will be appreciated that if such singles are stacked, lower shingles in the package may be prone to falling as the topmost shingles are removed therefrom increasing hazard at the job site.

Additionally, buckets or containers that hang from a ladder have been disclosed to hold objects from a ladder. A disadvantage of such devices is that they have enclosed sidewalls, making it difficult to locate objects such as roofing shingles therein. Examples of these devices include U.S. Pat. No. 6,604,721 to Ahl et al. and U.S. Pat. No. 5,064,090 to Farrier.

SUMMARY OF THE INVENTION

According to a first embodiment of the present invention there is disclosed an apparatus for holding supplies on a ladder having a plurality of laterally extending rungs supported by side rails comprising a U-shaped bracket having front and rear walls spaced apart to form a gap therebetween, at least one hook adapted to receive at least one ladder rung therein and wherein the bracket is secured to the at least one hook.

The at least one hook may be spaced apart from the rear wall of the bracket a distance sized to position the rear wall above the ladder side rails. The at least one hook may have a length extending proximate to the ladder side rails. The at least one hook may comprise two spaced apart hooks, each of the hooks positioned proximate to a ladder side rail. The at least one hook may comprise at least one top hook and at least one bottom hook. The at least one top hook and the at least one bottom hook may be spaced apart vertically by a distance selected to each receive a ladder rung therein.

The front and rear walls may each include a top portion angled away from the gap. The top portion may extend above the at least one hook. The gap may have a width of between 3 and 6.5 inches.

The apparatus may further include a ring at a top portion of the u-shaped bracket adapted to be engaged by a flexible tension member so as to permit the apparatus to be pulled up a ladder. The hooks may have catches to engage and release rungs of a ladder as the apparatus is moved up the ladder. The apparatus may further comprise a pulley securable to a ladder, the pulley rotatably supporting a flexible tension member secured to the u-shaped bracket to permit a user to pull the u-shaped bracket up the ladder.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
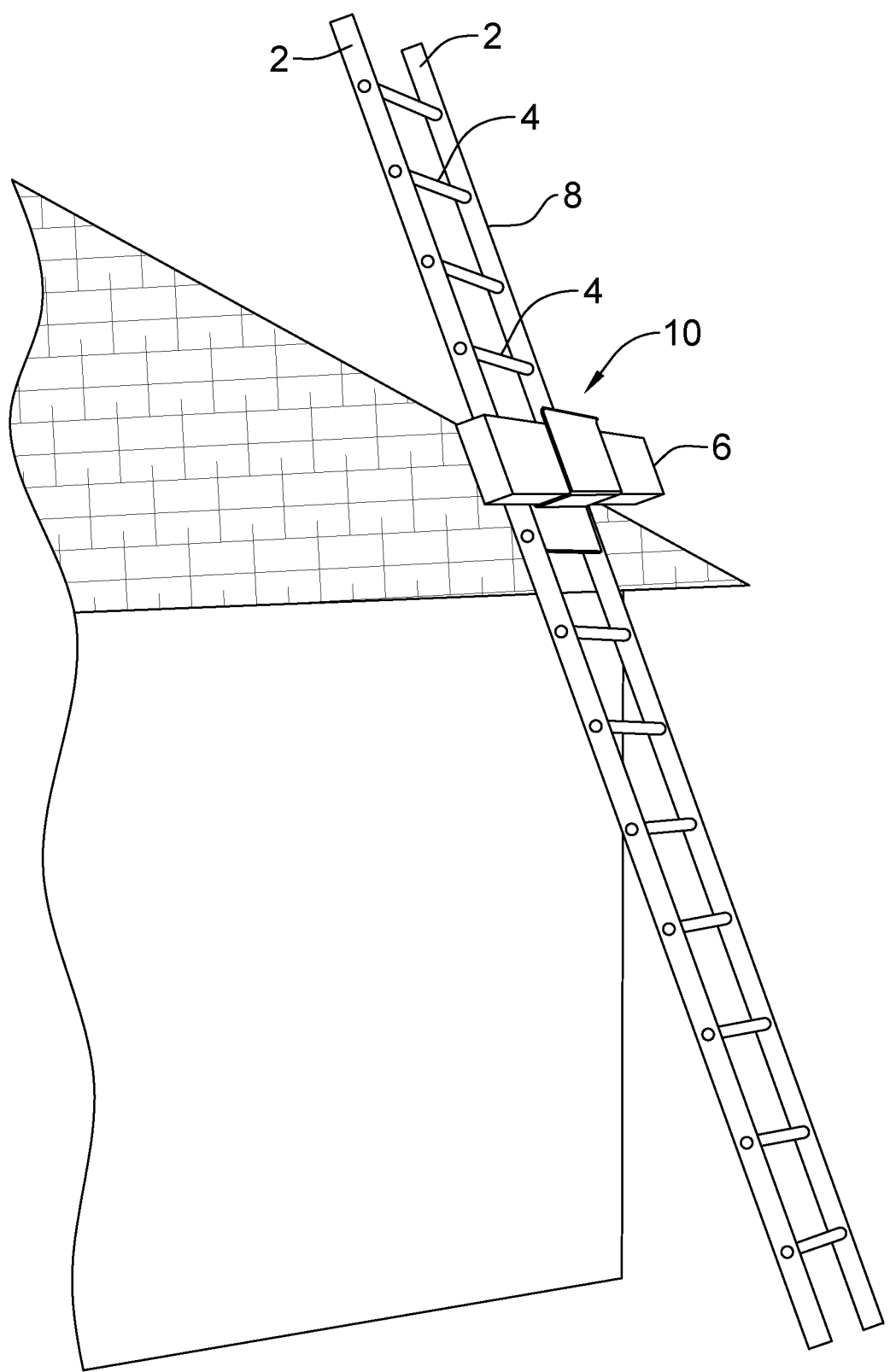
FIG. 1 is a perspective view of an apparatus for holding supplies on a ladder, secured to a ladder with a bundle of roofing shingles therein, according to a first embodiment of the present invention.

Referring to FIG. 1, an apparatus for holding supplies on a ladder according to a first embodiment of the invention is shown generally at 10, secured to a ladder 8. The apparatus 10 may be used to hold supplies, such as a bundle of roofing shingles 6, or the like on the ladder 8.

Figure 2:
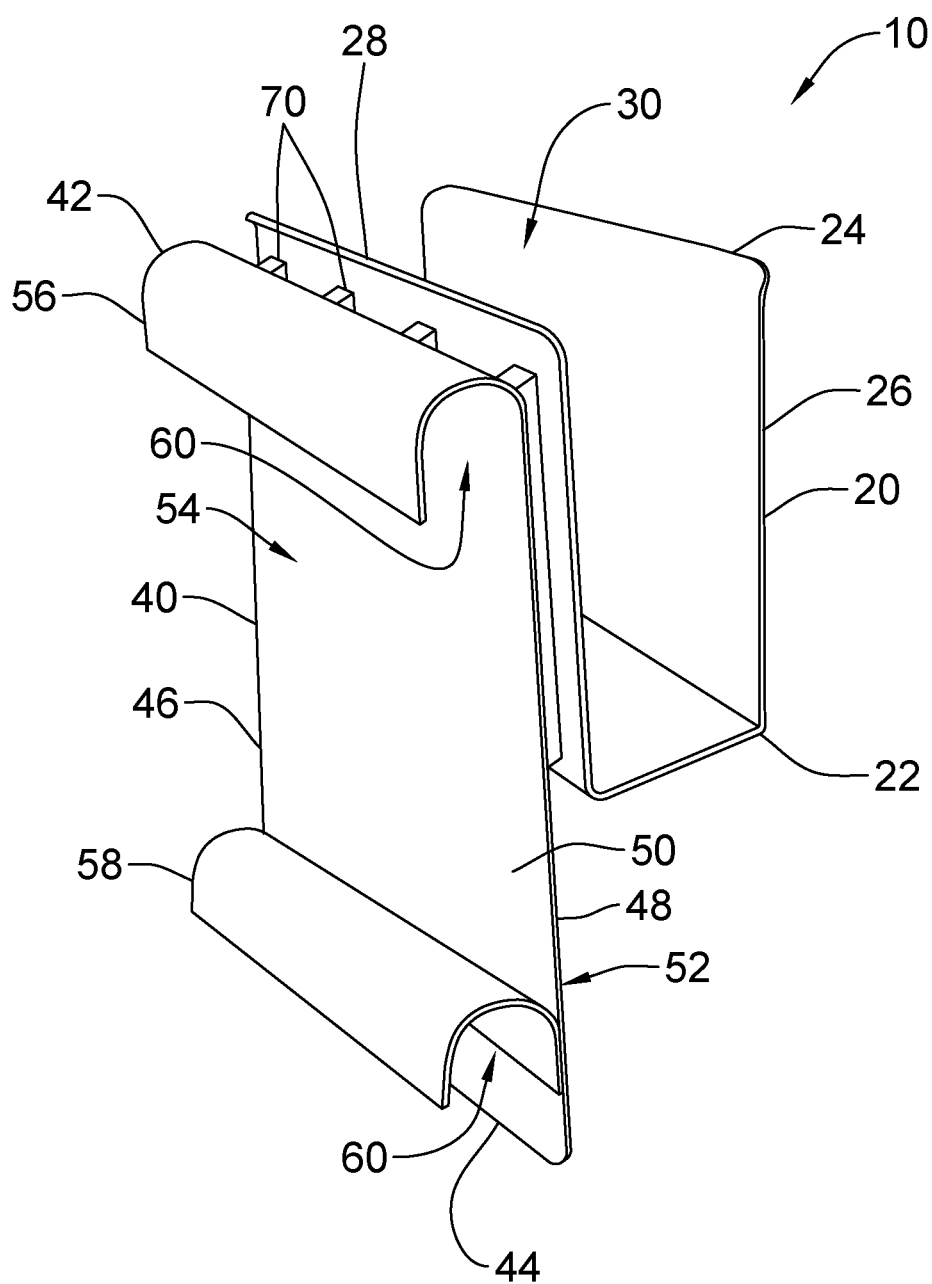
FIG. 2 is a perspective view of the apparatus of FIG. 1.
Figure 3:
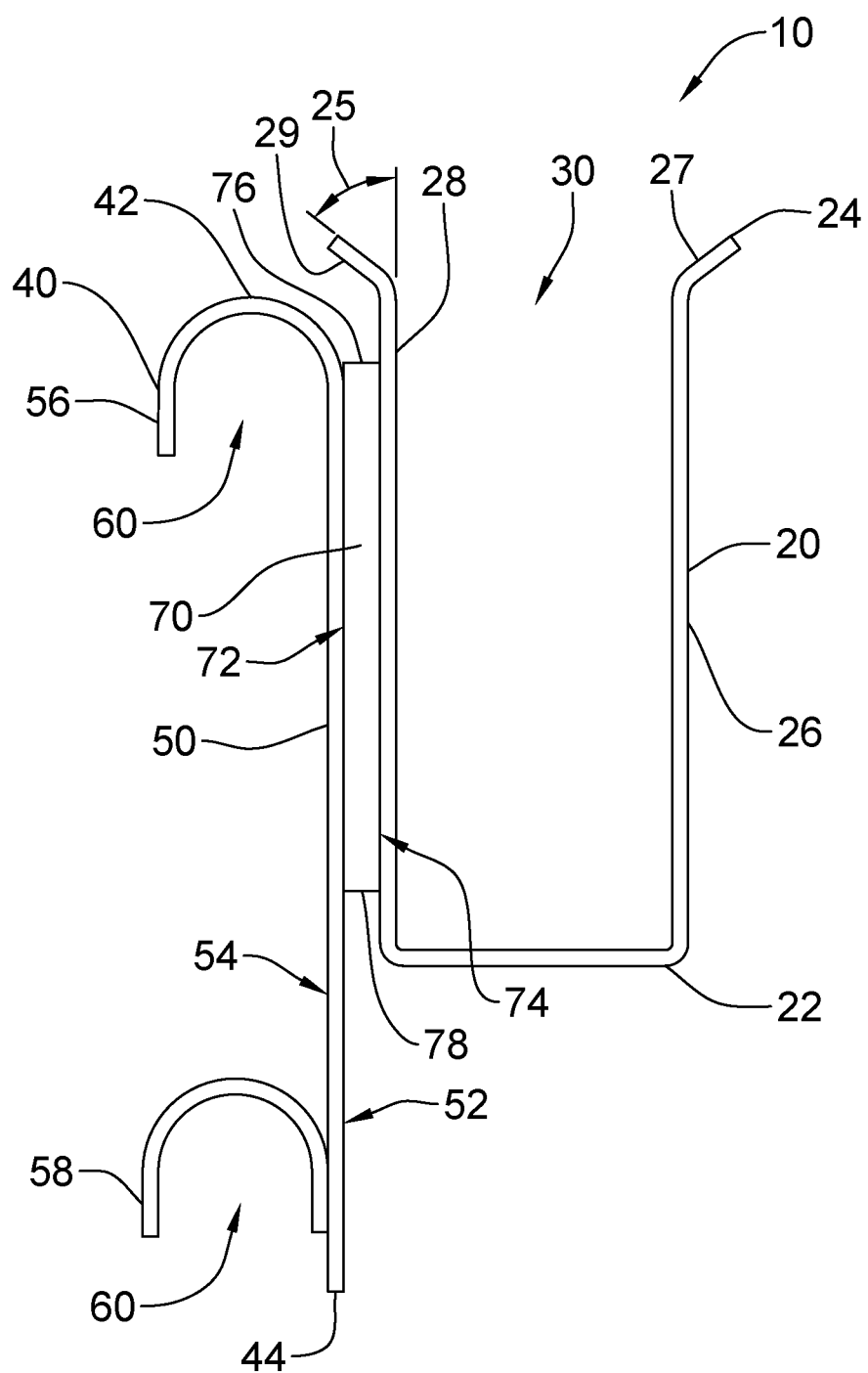
FIG. 3 is a side view of the apparatus of FIG. 1.

Referring to FIGS. 1-3, the apparatus 10 comprises a U-shaped bracket 20 secured to a hook assembly 40 with a plurality of spacers 70 therebetween. The hook assembly 40 is hung on the rungs 4 of a ladder 8 between the side rails 2 with the bracket 20 spaced apart from the side rails 2.

Figure 4:
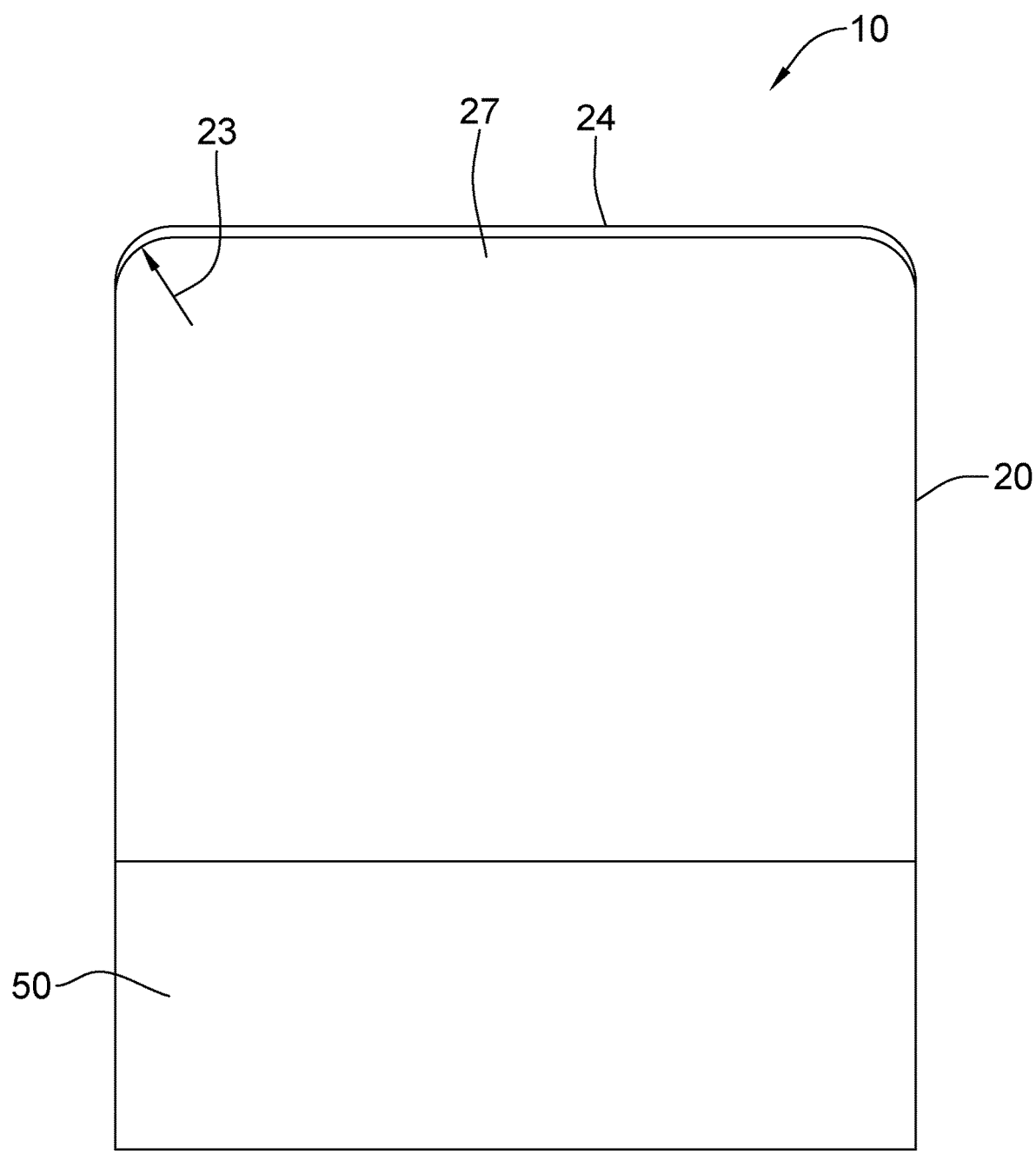
FIG. 4 is a front view of the apparatus of FIG. 1.

The bracket 20 extends between a bottom 22 and a top edge 24 and includes front and rear walls, 26 and 28, respectively, spaced apart to form a gap 30 therebetween. The gap 30 is sized to receive a bundle of roofing shingles 6 therein and may have a width such as, by way of non-limiting example, in the range of 3 to 6.5 inches (75 mm to 165 mm). Proximate to the top edge 24 of each of the front and rear walls, 26 and 28 is included an entrance portion, 27 and 29, respectively, angled away from the gap 30 as illustrated to form a widened entry location to facilitate insertion of the bundle of roofing shingles 6. As illustrated in FIG. 3, the entrance portions 27 and 29 may comprise substantially planar members with an angle 25 to the front or rear walls 26 and 28. The angle 25 may be selected to be up to 30 degrees. Optionally, each of the entrance portions 27 and 29 may be formed of a radiused portion as illustrated in FIG. 4. The corners of the top edge 24 of each of the front and rear walls 26 and 28, may be radiused 23, so as to reduce the likelihood of catching on the shingles or other objects.

Figure 5:
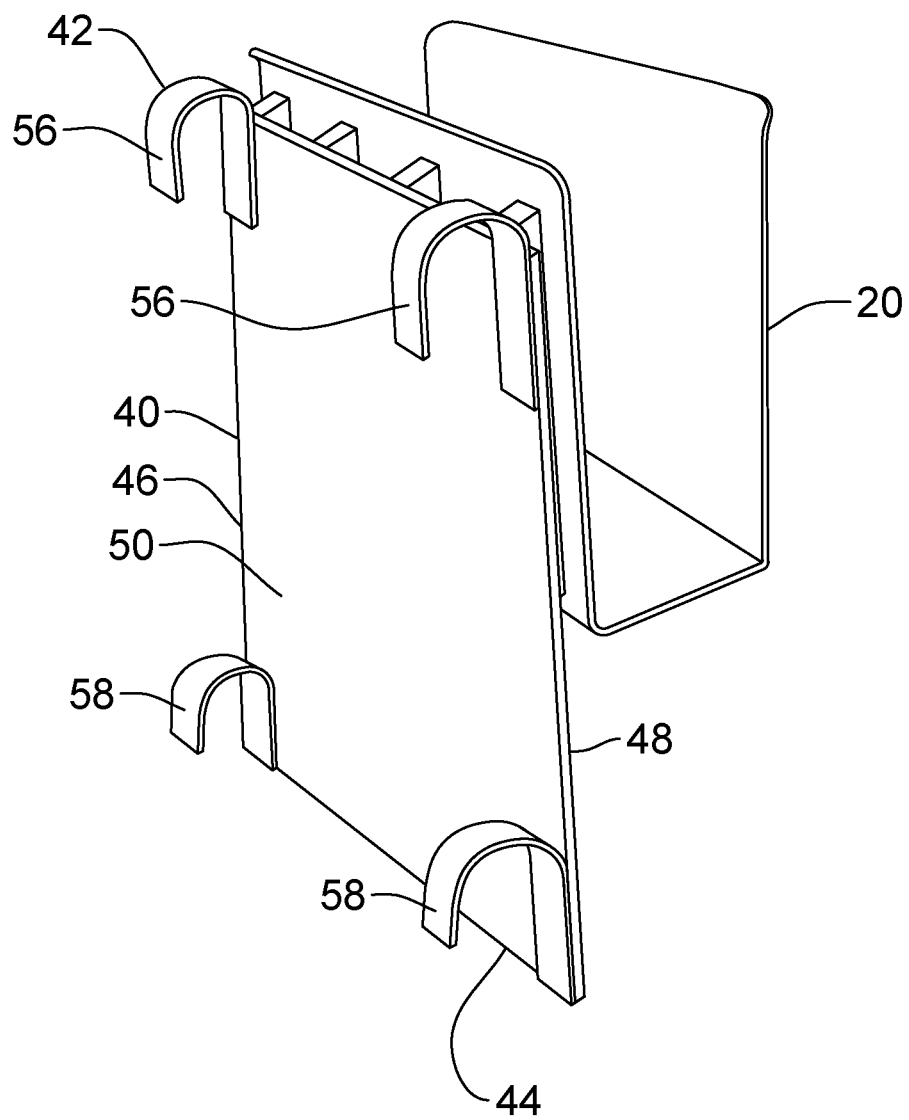
FIG. 5 is a perspective view of a further embodiment of the apparatus.

The hook assembly 40 extends between top and bottom edges, 42 and 44, respectively, and between first and second side edges, 46 and 48, respectively. The hook assembly 40 includes a plate 50 having front and rear surfaces 52 and 54, respectively, with first and second hooks, 56 and 58, extending from the rear surface 54. The first hook 56 is positioned proximate to the top edge 42 and the second hook 58 is positioned proximate to the bottom edge 44. The first and second hooks, 56 and 58, include rung cavities 60 spaced apart to receive ladder rungs 4 therein. The hook assembly 40 is sized such that the first and second side edges 46 and 48 are positioned proximate to the side rails 2 of the ladder 8 when hung on the rungs 4. The first and second hooks 56 and 58 may be formed in a of a semi-spherical shape as illustrated, although it will be appreciated that other shapes may be useful, as well, such as segmented, semi-octagonal, square, rectangular or another arcuate shape having a cavity adapted to receive a ladder rung 4 therein. As illustrated in FIGS. 2 and 3, the first hook 56 is co-formed with the plate 50 and the second hook 58 is formed separated from the plate 50 and secured thereto. It will be appreciated that both hooks 56 and 58 may be co-formed with the plate 50 or secured thereto by means as are commonly known. As illustrated, the first and second hooks 56 and 58 extend between the first and second side edges 46 and 48. It will be appreciated that the hooks 56 and 58 may each be formed as a plurality of hooks with a plurality of hooks proximate to the top edge 42, such as, by way of non-limiting example, one hook proximate to the first side edge 46 and a second hook proximate to the second side edge 48, and a plurality of hooks proximate to the bottom edge 44, formed in the same manner, as illustrated in FIG. 5.

The spacers 70 extend between first and second surfaces, 72 and 74, respectively and between top and bottom edges, 76 and 78, respectively and join the hook assembly 40 to the bracket 20. The first surface 72 of each spacer 70 is secured to the front surface 52 of the plate 50 and the second surface 74 of each spacer 70 is secured to the rear wall 28 of the bracket 20. The spacers 70 are positioned such that the top edge 76 is positioned below the top edge 42 of the hook assembly 40 and below the top edge 24 of the bracket 20, and the bottom edge 78 of each spacer 70 extends to proximate the bottom 22 of the bracket 20. The bracket 20 is positioned such that the top edge 24 extends above the top edge 42 of the hook assembly 20. There may be a plurality of spacers 70, such as, by way of non-limiting example, 4 spacers as illustrated in FIG. 2, although it will be appreciated that more or less spacers 70 may be useful, as well. Although the spacers 70 are illustrated as separate parts, it will be appreciated that the spacers 70 may be co-formed with the plate 50 or with the bracket 20. The distance between the first and second surfaces 72 and 74 is selected such that the second surface 74 extends beyond the side walls 2 of the ladder 8 when the hook assembly 40 is engaged on the rungs 4, such that the gap 30 of the bracket 20 does not intersect with the ladder 8, thereby allowing for items having a width greater than the width of the ladder to be received within the gap 30.

The apparatus 10 may be formed using sheet metal, as is commonly known, with connections formed using methods that are commonly known, such as welding or adhesives. It will be appreciated that the apparatus 10 may also be formed with injection molded plastic material. Although only one of each of the first and second hook 56 and 58 are illustrated in FIGS. 1-3 it will be appreciated that more than one of each of the first and second hooks may be provided as illustrated in FIG. 5.

Figure 6:
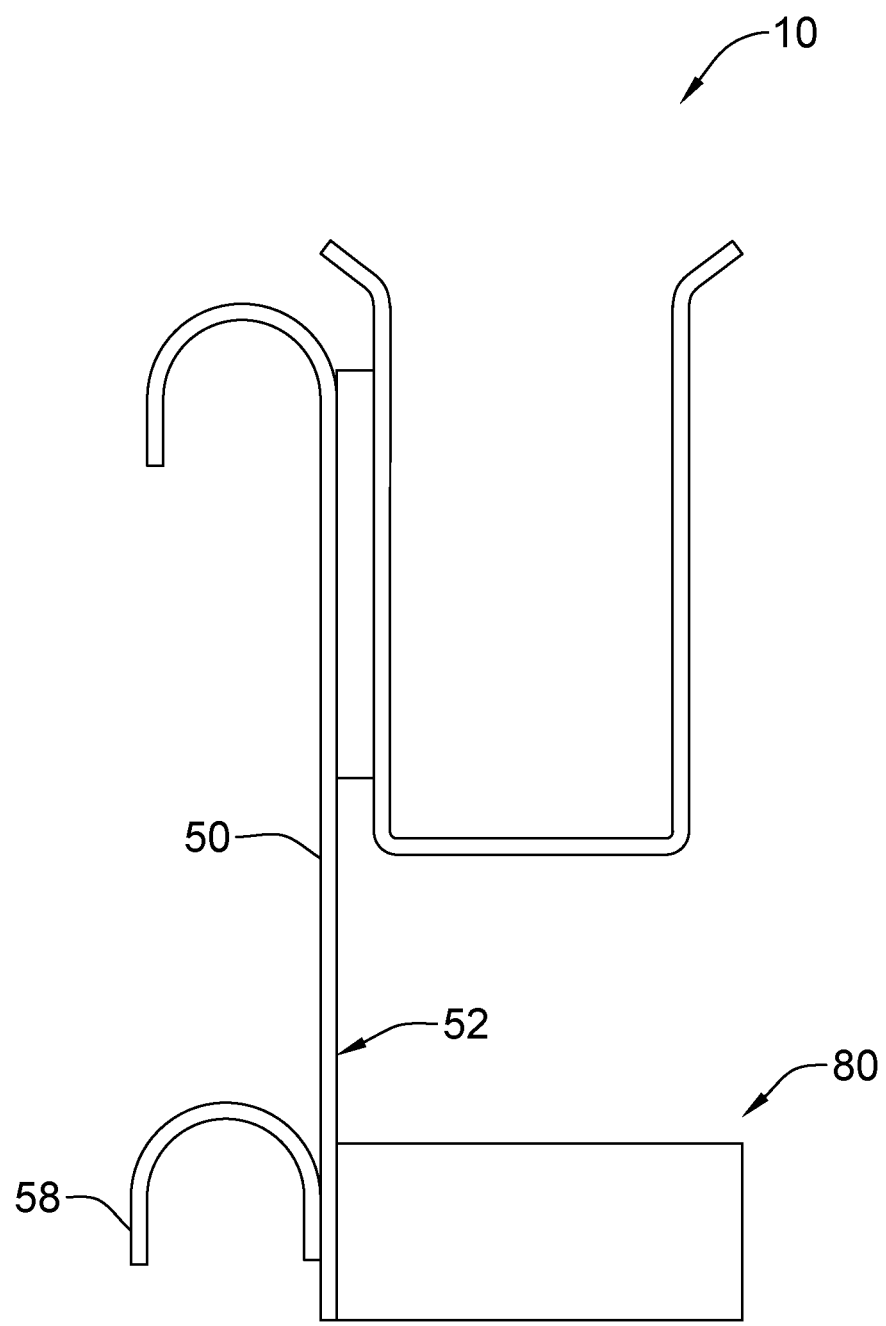
FIG. 6 is a side view of a further embodiment of the apparatus.

Turning now to FIG. 6, a further embodiment of the apparatus 10 is illustrated with a step 80 extending from the rear surface 52 of the plate 50 opposite from the second hook 58. The step 80 provides the user with a means to climb the ladder 8 past the apparatus 10.

Figure 7:
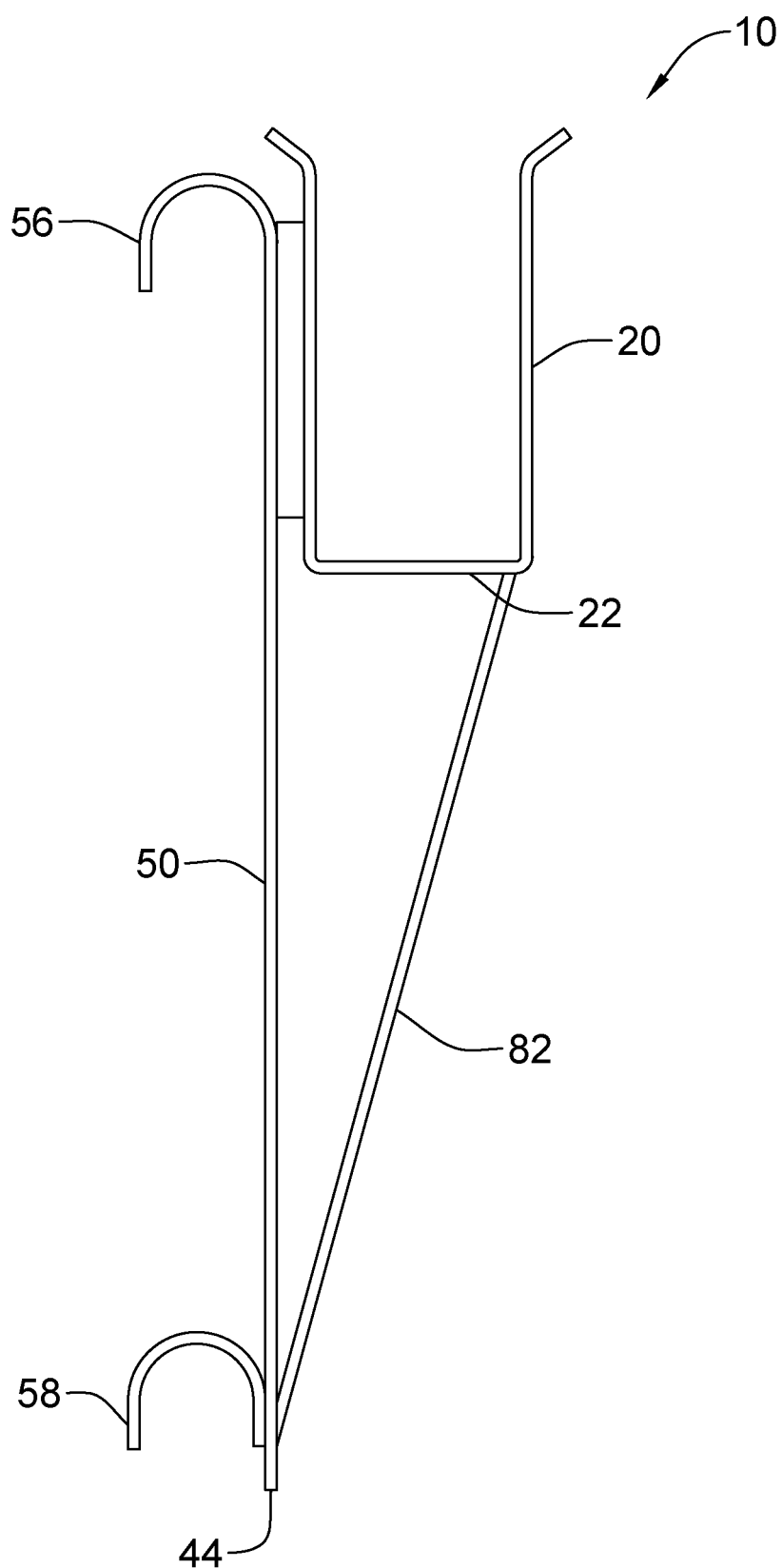
FIG. 7 is a side view of a further embodiment of the apparatus.

Turning now to FIG. 7, a further embodiment of the apparatus 10 is illustrated with the first and second hooks 56 and 58 spaced apart such that the apparatus 10 extends over a plurality of ladder rungs 4, such as, by way of non-limiting example, three ladder rungs 4. A support 82 extends at an angle between the bottom 22 of the bracket 20 and the plate 50 proximate to the bottom edge 44. This configuration allows for heavier items, such as, by way of non-limiting example, sheets of plywood, to be retained within the bracket 20, providing support to the load which is distributed over a greater length of the ladder 8.

Figure 8:
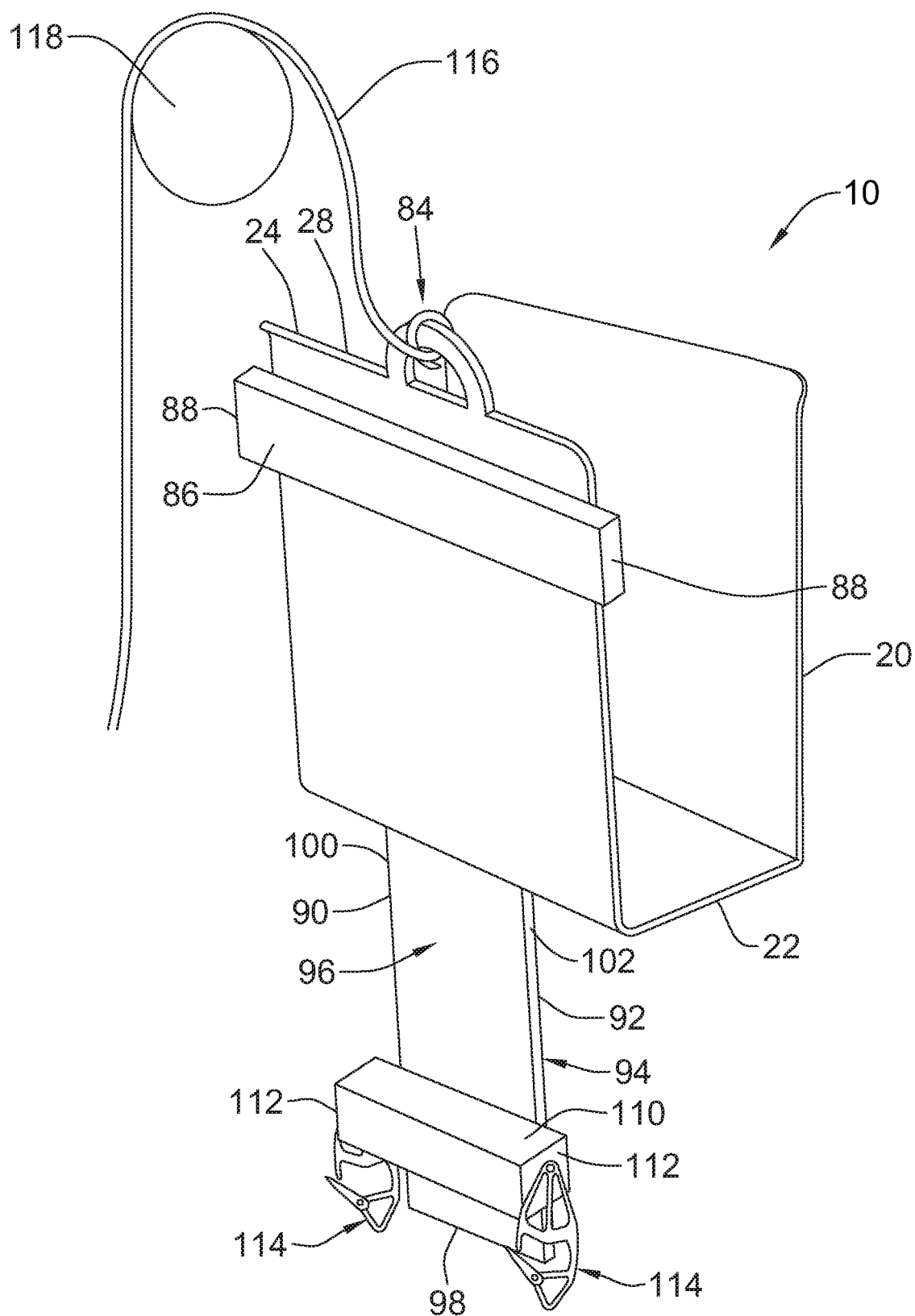
FIG. 8 is a perspective view of a further embodiment of the apparatus.

Turning now to FIG. 8, a further embodiment of the apparatus 10 for use with a manual hoist system, as is commonly known, is illustrated. The apparatus 10 includes a hoist ring 84, as is commonly known, extending from the rear wall 28 of the bracket 20. Although the hoist ring 84 is illustrated as being co-formed with the rear wall 28, it will be appreciated that other lift attachment means may be used, such as, by way of non-limiting example, a standard hoist ring attached with a fastener. A hoist rope (not shown) is secured to the hoist ring 84 by means as are commonly known.

A spacer 86 is secured to the rear wall 28 of the bracket 20 proximate to the top edge 24 and extends between distal ends 88. The distal ends 88 extend beyond the side edges of the bracket 20, with the length of the spacer 86 between distal ends 86 selected to be received between the ladder side rails 2 so as to maintain the apparatus 10 centered therebetween. The length of the spacer 86 may be such as, by way of non-limiting example, 16 inches (406 mm).

A hook assembly 90 includes a plate 92 having front and rear surfaces 94 and 96, respectively, with a hook support 110 extending from the rear surface 96. The plate 92 extends from the bottom 22 of the rear wall 28 of the bracket 20 to a bottom edge 98 and between first and second side edges, 100 and 102, respectively. The plate 92 is selected such that the distance between the first and second side edges, 100 and 102, is less than the width of the bracket 20.

The hook support 110 is extends from the rear surface 96 of the plate 92 proximate to the bottom edge 98. The hook support 110 extends between distal ends 112. The distal ends 112 extend beyond the first and second side edges 100 and 102 of the plate 92, with the length of the hook support 110 between distal ends 112 selected to be received between the ladder side rails 2. The length of the hook support 110 may be such as, by way of non-limiting example, 12 inches (305 mm). A retractable hook 114 is pivotably secured to each distal end 112 of the hook support 110. The retractable hooks 114 may be such as, by way of non-limiting example, rung locks, as are commonly known in the art.

To utilize the apparatus 10 as illustrated in FIG. 8, a hoist rope 116 is attached to the hoist ring 84 by means as are commonly known. The hoist rope is extended over the top of the ladder 8 or a pulley 118 and back down to the user. When the user applies a downward force on the distal end of the hoist rope, the apparatus 10 is raised up the ladder 8 with the spacer 86 maintaining the apparatus centered between the rails 8. As the apparatus 10 is lifted, the retractable hooks 114 slide past the rungs 4, as is commonly known. When the upward force on the apparatus 10 is released, the retractable hooks engage upon a rung 4, as is commonly known in the art, and the apparatus 10 is retained in position.

While specific embodiments of the invention have been described and illustrated, such embodiments should be considered illustrative of the invention only and not as limiting the invention as construed in accordance with the accompanying claims.

What is claimed is:

1. An apparatus for holding supplies on a ladder having a plurality of laterally extending rungs supported by side rails comprising:
   a hook assembly comprising a planar member having at least one hook adapted to receive at least one ladder rung therein wherein said planar member has a width selected to be received between the side rails of the ladder;
   a U-shaped bracket having front and rear walls spaced apart to form an unobstructed gap therebetween so as to be operable to receive a planar body exceeding the dimensions of said U-shaped bracket,
   wherein said bracket is secured to and spaced apart from said planar member,
   wherein each of said front and rear walls are parallel to and have a width corresponding to said planar member.

2. The apparatus of claim 1 wherein said at least one hook is spaced apart from said rear wall of said bracket a distance selected to correspond to the distance from a ladder rung to a top surface of an adjacent side rail.

3. The apparatus of claim 1 wherein said at least one hook extends substantially across a width of said U-shaped bracket.

4. The apparatus of claim 1 wherein said at least one hook comprises two spaced apart hooks.

5. The apparatus of claim 1 wherein said at least one hook comprises at least one top hook and at least one bottom hook.

6. The apparatus of claim 5 wherein said at least one top hook and said at least one bottom hook are spaced apart vertically by a distance selected to correspond to the distance between rungs of the ladder.

7. The apparatus of claim 1 wherein said front and rear walls each include a top portion angled away from said gap.

8. The apparatus of claim 7 wherein said top portion extends above said at least one hook.

9. The apparatus of claim 1 wherein said gap has a width of between 3 and 6.5 inches.

10. The apparatus of claim 1 further including a ring at a top portion of said u-shaped bracket adapted to be engaged by a flexible tension member so as to permit said apparatus to be pulled up a ladder.

11. The apparatus of claim 10 wherein said hooks have catches to engage and release rungs of a ladder as said apparatus is moved up the ladder.

12. The apparatus of claim 10 further comprising a pulley securable to a ladder, said pulley rotatably supporting a flexible tension member secured to said u-shaped bracket to permit a user to pull said u-shaped bracket up the ladder.

* * * * *